(12) United States Patent
Harada et al.

(10) Patent No.: US 7,916,203 B2
(45) Date of Patent: Mar. 29, 2011

(54) IMAGE CAPTURE APPARATUS AND PRISM ASSEMBLY AND METHOD OF MANUFACTURING THE SAME

(75) Inventors: Kiyoshi Harada, Kanagawa (JP); Shinji Takemoto, Kanagawa (JP); Masahito Kikuchi, Tokyo (JP); Shohei Abe, Shizuoka (JP)

(73) Assignee: Sony Corporation (JP)

( * ) Notice: Subject to any disclaimer, the term of this patent is extended or adjusted under 35 U.S.C. 154(b) by 672 days.

(21) Appl. No.: 11/973,923

(22) Filed: Oct. 11, 2007

(65) Prior Publication Data

US 2008/0088730 A1    Apr. 17, 2008

(30) Foreign Application Priority Data

Oct. 17, 2006    (JP) .............................. P2006-282842

(51) Int. Cl.
 *H04N 9/07*    (2006.01)
(52) U.S. Cl. ........................................ 348/337; 348/338
(58) Field of Classification Search .................. None
See application file for complete search history.

(56) References Cited

U.S. PATENT DOCUMENTS

2008/0136946 A1* 6/2008 Hasegawa ..................... 348/294

FOREIGN PATENT DOCUMENTS

| JP | 11-275595 A | | 10/1999 |
| JP | 2005012477 A | * | 1/2005 |

* cited by examiner

*Primary Examiner* — David L Ometz
*Assistant Examiner* — Angel L Garces-Rivera
(74) *Attorney, Agent, or Firm* — Lerner, David, Littenberg, Krumholz & Mentlik, LLP (57) ABSTRACT

An image capture apparatus is provided. The image capture apparatus includes a prism that separates light incident through a lens into at least two color components of light to be output and an image capture device that converts light separated by and output from the prism into a captured image signal. The image capture apparatus includes a fixing plate attached to the image capture device mounted on a substrate. In addition, the image capture apparatus includes a plurality of fixing members for fixing an unattached surface of the fixing plate, which is unattached to the image capture device, on a side surface of the prism through an adhesive.

9 Claims, 7 Drawing Sheets

IMAGE CAPTURE APPARATUS AND PRISM ASSEMBLY AND METHOD OF MANUFACTURING THE SAME

CROSS REFERENCE TO RELATED APPLICATIONS

The present invention application claims priority from Japanese Patent Application No. JP 2006-282842, filed in the Japanese Patent Office on Oct. 17, 2006, the entire content of which is incorporated herein by reference.

BACKGROUND OF THE INVENTION

1. Field of the Invention

The present invention relates to an image capture apparatus suitable to be applied to a video camera with a mechanism for separating light incident through a prism and to a method of manufacturing such an image capture apparatus.

2. Description of the Related Art

In order to satisfy performances of high definition and high sensitivity, separation of light into color components has been carried out in comparatively expensive video cameras, such as those for business use. That is, light passed through a single lens is separated into three color components of red (R), green (G), and blue (B) by a color-separation prism. Images of separated rays are then formed on their respective image capture devices. In this case, a position alignment between a prism and the image capture devices should be carried out with reference to each of six different axes of the light-receiving surface of each image capture device. That is, the position alignments should be carried out in the horizontal direction (X-axis), vertical direction (Y-axis), and cross direction (z-axis) thereof and rotation directions ($\alpha$, $\beta$, and $\gamma$) about their respective axes. In addition, the position alignments with respect to the six axes should be performed with sufficient accuracy in the order of micrometers. If the position alignment is not performed correctly, a disadvantage, such as a registration gap, may occur.

Thus, the fixing between the prism and the respective image capture devices may require a high accuracy with respect to the position, so that various procedures have been proposed for their position alignments and fixing.

Japanese Unexamined Patent Application Publication No. 11-275595 (JP 11-275595 A) discloses that force to stabilize an adhesion layer between a color-separation prism and an image capture device is provided and then the color-separation prism and the image capture device are fixed together.

SUMMARY OF THE INVENTION

As described above, a prism and an image capture device should be brought into alignment with each other and then fixed together. Thus, in general, their alignment is carried out before mounting the image capture device on a substrate. In other words, it is carried out using a single unit of the image capture device. This is because such substrate having a large volume may be a destabilizing factor in the position alignment. However, in the case of the procedure for mounting an image capture device on a substrate after fixing the image capture device with a prism, there is a disadvantage in that the number of steps for assembly increases.

Furthermore, fixing between a prism and an image capture device has been carried out using an adhesive in many cases. However, there may be no adhesive having the same linear expansion coefficient as that of the prism. Thus, there is a disadvantage in that, the more the amount of the adhesive used increases, the more the tendency of displacement between a color-separation prism and an image capture device increases.

It is desirable to reduce the number of steps for fixing between a prism and an image capture device while minimizing the displacement of the prism and the image capture device as a result of temperature changes after the fixing.

According to an embodiment of the present invention, there is provided an image capture apparatus having a prism that separates light incident through a lens into at least two color components to be output and an image capture device that converts light separated by and output from the prism into a captured image signal. The image capture apparatus is configured as follows. The image capture device mounted on a substrate is first attached to a fixing plate in the case where the image capture device is fixed on the prism. Subsequently, a UV-curing adhesive is applied on the side of a fixing member facing to the unattached surface of the fixing plate, which is unattached to the image capture device. In addition, UV-curing adhesive is applied on another side of the fixing member facing to the side surface of the prism. The fixing member is provided to fix the unattached surface of the fixing plate on the side surface of the prism. The fixing member applied with the adhesive is brought into contact with the side surface of the prism by sliding over the unattached surface, which is unattached to the image capture device, of the fixing plate. After that, the UV-curing adhesive is cured by UV irradiation.

As described above, the image capture device mounted on the substrate is attached to the fixing plate and then fixed on the prism through the fixing member. Thus, a displacement can hardly occur even when the prism is fixed after mounting the image capture device on the substrate.

Furthermore, the fixing member applied with the adhesive is brought into contact with the side surface of the prism by sliding over the fixing plate. Thus, the fixing member and the prism can be fixed as a result of the line contact. Consequently, the amount of the adhesive having a linear expansion coefficient different from that of the prism can be reduced to the minimum.

According to an embodiment of the present invention, the number of steps of the procedure of fixing between the prism and the image capture device can be reduced. In addition, the displacement between the prism and the image capture device as a result of temperature changes after fixing can be minimized.

BRIEF DESCRIPTION OF THE DRAWINGS

FIGS. 5A and 5B are side views illustrating an example of the lengths of a prism and a fixing glass plate according to an embodiment of the present invention, where FIG. 5A illustrates the arrangement of an image capture device and a prism in the absence of a fixing glass plate and FIG. 5B illustrates the arrangement in the presence of a fixing glass plate 1.

FIGS. 6A and 6B are schematic diagrams of an example of a dust-resistant member according to an embodiment of the present invention, where FIG. 6A is a cross sectional view of the dust-resistant member and FIG. 6B is a front view of the dust-resistant member.

DESCRIPTION OF THE PREFERRED EMBODIMENTS

Hereinafter, a video camera according to an embodiment of the present invention will be described with reference to FIGS. 1 to 10. The video camera includes: a prism 40 that separates incident light into three color components, R, G, and B; and a CMOS (Complementary Metal Oxide Semiconductor) device as an image capture device 1.

Figure 1:
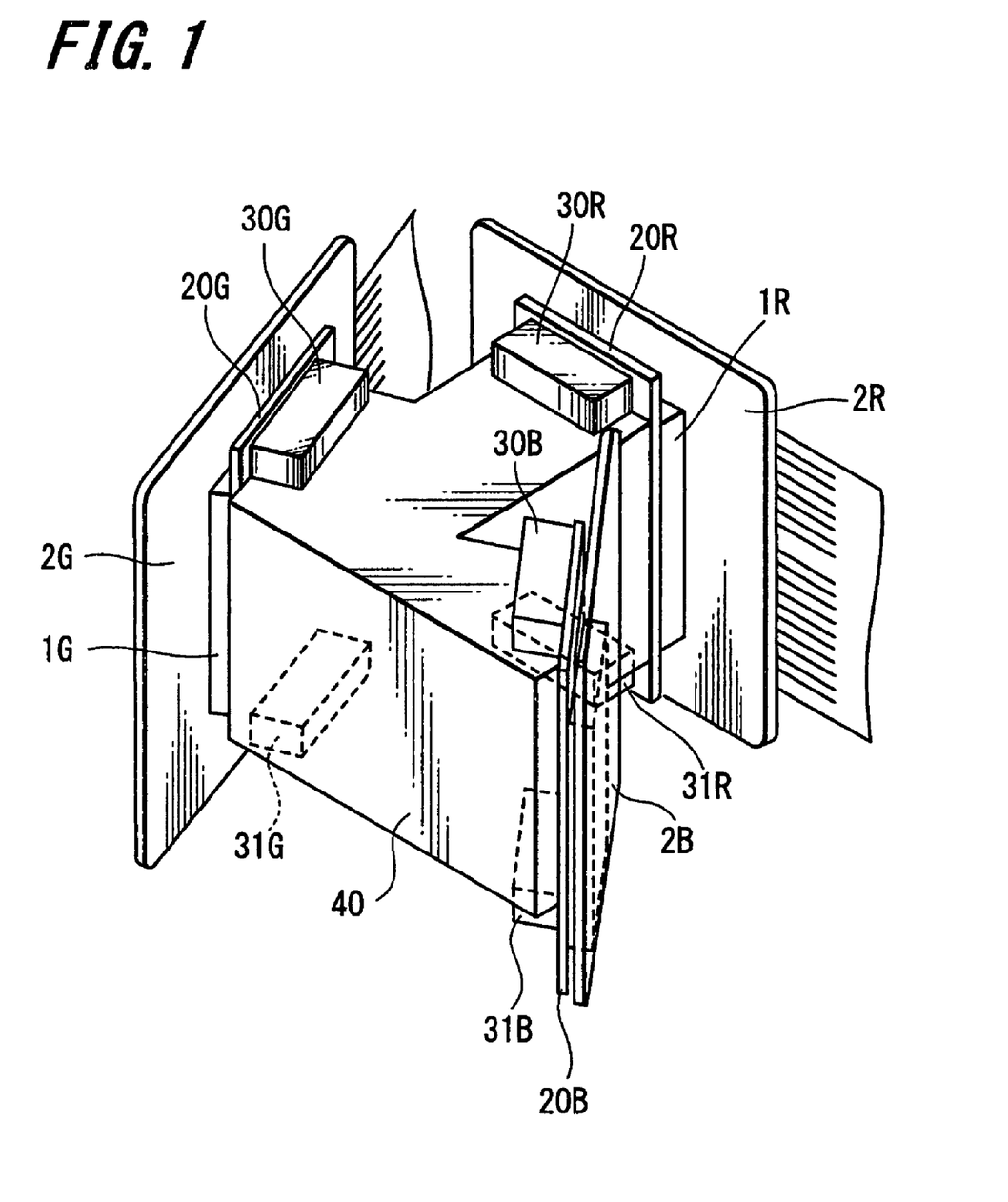
FIG. 1 is a perspective view illustrating an example of fixing between an image capture device and a prism according to an embodiment of the present invention.

FIG. 1 illustrates that the image capture device 1 mounted on a substrate 2 is fixed to the prism 40. In this embodiment, a CMOS device is used as the image capture device 1. In other words, the fixing is carried out while a CMOS package containing a CMOS device is surface-mounted on the substrate.

Figure 2:
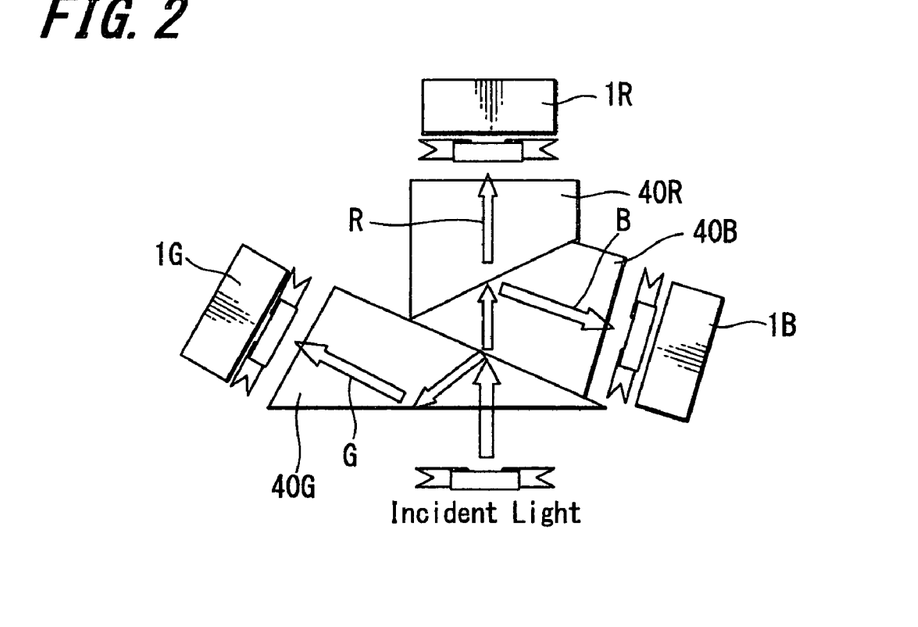
FIG. 2 is a side view illustrating an example of an arrangement of an image capture device and a prism according to an embodiment of the present invention.

Specifically, FIG. 1 and FIG. 2 illustrates that the image capture device 1 includes a G-channel image capture device 1G, a R-channel image capture device 1R, and a B-channel image capture device 1B. These devices are fixed on light-output surfaces of respective blocks 40G, 40R, and 40B of the prism 40, respectively. The image capture devices 1G, 1R, and 1B are attached to the blocks 40G, 40R, and 40B of the prism 40 through fixing glass plates (fixing plates) 20G, 20R, and 20B, respectively, and being held by fixing glass members 30G and 31G, 30R and 31R, and 30B and 31B, respectively. The details of the fixing positions and the procedure of the fixing will be described later.

Furthermore, referring to FIG. 2, the positional relationship between the prism 40 and the image capture device 1 will be described. The substrate is not shown in FIG. 2 for facilitating understanding of the description.

First, light component G is separated by the block 40G of the prism 40 from input light incident on the prism 40 from the lower part as shown in FIG. 2. The separated light component G forms an image on the light-receiving surface of the G-channel image capture device 1G. Next, light component B is separated by the block 40B of the prism 40 from the light passed through the block 40G. The separated light component B forms an image on the light-receiving surface of the B-channel image capture device 1B. Then, the light passed through the blocks 40G and 40B, that is, light component R passes through the block 40R and forms an image on the light-receiving surface of the R-channel image capture device 1R. The details of the position alignments between the prism 40 and the respective image capture devices 1G, 1R, and 1B will be described later.

Figure 3:
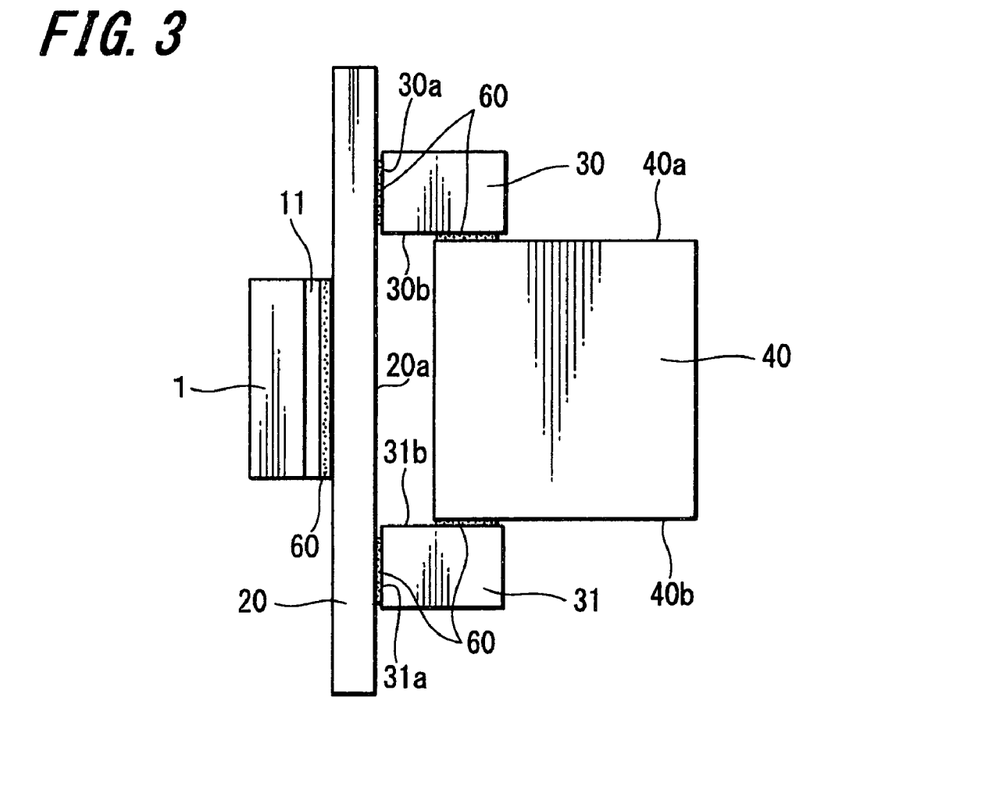
FIG. 3 is a side view illustrating an example of fixing between an image capture device and a prism according to an embodiment of the present invention.

Furthermore, referring to FIG. 3, the adhesion between the prism 40 and the image capture device 1 will be described in detail. FIG. 3 is a side view that illustrates the fixing between the prism 40 and the image capture device 1. Although the substrate is not shown in FIG. 3 as in the case with FIG. 2, the fixing of the substrate with the prism 40 is performed with the image capture device 1 having been mounted on the substrate. In FIG. 3, if the substrate is illustrated in the figure, it will be illustrated on the left side of the image capture device 1. Furthermore, in FIG. 3, the prism 40 is illustrated as only a single block. Actually, however, the same kind of fixing occurs with respect to each block of the prism 40 for three different channels (R, G, and B).

As shown in FIG. 3, the image capture device 1 is sealed with a CMOS-sealing glass member 11. The CMOS-sealing glass member 11 is attached to the fixing glass plate 20 through a UV (ultraviolet) adhesive 60. Furthermore, fixing glass members 30 and 31 are fixed to the prism 40 through a UV adhesive so as to hold the side surfaces 40a and 40b of the prism 40.

In the present embodiment, the CMOS package on which the image capture device 1 is mounted is attached to the fixing glass plate 20 through the CMOS-sealing glass member 11, which is a sealing member for the CMOS package.

In addition, in order to increase the fixing accuracy between the respective members, a UV-curing adhesive (hereinafter, referred to as UV adhesive) is used as an adhesive having a small curing shrinkage and a short curing time.

In addition, for making the adhesive more resistant against temperature changes, the fixing glass plate 20 and the fixing glass members 30, 31 are formed of the same material as that of the prism 40.

Furthermore, surface tension is used in adhesion between the fixing glass members 30, 31 and the fixing glass plate 20 and in adhesion between the fixing members 30, 31 and the prism 40. Accordingly, it becomes possible to reduce the volume of the adhesive. Thus, a change in relative position between the image capture device 1 and the prism 40 can be prevented. In addition, a variation with time can be prevented.

In the above-described state, if the surface tension of the attaching surfaces between the fixing glass members 30, 31 and the fixing glass plate 20 is almost the same as that of the attaching surfaces between the fixing glass members 30, 31 and the prism 40, the fixing glass members 30, 31 become instable. As a result, a displacement may be caused between the image capture device 1 and the prism 40. Accordingly, in this embodiment, the roughness of the attaching surfaces between the respective members varies so that the strength of surface tension acting between the respective members can be changed. In other words, a surface 20a of the fixing glass plate 20, which is unattached to the image capture device 1, is a mirror surface. Also, a surface 30a of the fixing glass member 30, which is attached to the fixing glass plate 20, is a mirror surface. Furthermore, the surface 31a of the fixing glass member 31, which is attached to the fixing glass plate 20, is a mirror surface. In contrast, the side surfaces 40a and 40b of the prism 40 are rough surfaces.

As described above, the attaching surfaces between the fixing glass plate 20 and the fixing glass members 30, 31 are mirror surfaces. Thus, a predetermined strength of surface tension may act on the attaching surfaces. In contrast, the attaching surfaces between the fixing glass members 30, 31 and the prism 40 are rough surfaces. Thus, the surface tension may hardly occur. Therefore, the adhesion between the fixing glass members 30, 31 and the fixing glass plate 20, where the attaching surfaces are mirror surfaces, becomes strong. Thus, the fixing glass members 30, 31 are attached to the fixing glass plate 20 perpendicularly. On the other hand, the fixing glass members 30, 31 are attached to the prism 40 having rough attaching surfaces in line contact.

Therefore, as a result of a position alignment between the image capture device 1 and the prism 40, the line contact between the fixing glass members 30, 31 and the prism 40 may compensate for the displacement between the fixing glass members 30, 31 and the prism 40. Such compensation may occur when the prism 40 is not aligned in parallel with the fixing glass plate 20, on which the image capture device 1 is mounted. A method of fixing the fixing glass members 30 and 31 will be described later.

Here, in the present embodiment, the roughness of the mirror surface is 0.5 μm or less in Rmax (maximum roughness). The roughness of the rough surface is 1.5 μm to 3 μm in Rmax.

As described above, the roughness of each of the attaching surfaces is suitably adjusted with respect to the adhesion between the fixing glass members 30, 31 and the fixing glass plate 20 and also between the fixing glass members 30, 31 and the prism 40. Thus, if the fixing glass members 30, 31 are improperly directed and attached, an expected fixing strength may hardly be attained. Therefore, the fixing glass members 30 and 31 are provided with cut-away portions 70 as shown in FIG. 4 to prevent the attaching surface to the fixing glass plate 20 and the attaching surface to the prism 40 from being mistaken and fixed.

Figure 4:
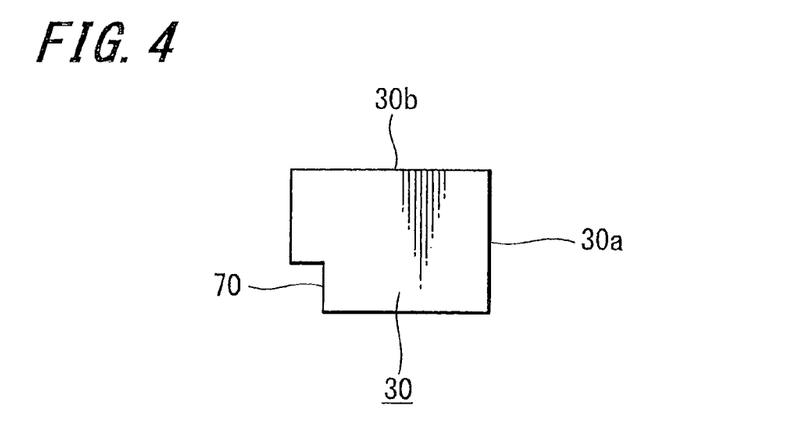
FIG. 4 is a side view illustrating an example of the configuration of the fixing glass member according to an embodiment of the present invention.

As shown in FIG. 4, the cut-away portion 70 is formed at a position where two surfaces are orthogonal with respect to each other, except of the surface 30a (or 31a) to be attached to the fixing glass plate 20 and the surface 30b (or 31b) to be attached to the prism 40. As the cut-away portion 70 is formed as described above, there is no possibility of the fixing without aligning the fixing glass members 30 and 31 in a wrong direction. Thus, the workability of the assembly can be improved. Furthermore, the fixing glass members 30 and 31 can be attached to the fixing glass plate 20 and the prism 40 without mistake, so that the fixing strength assumed at the time of design can be retained.

Figure 5A:
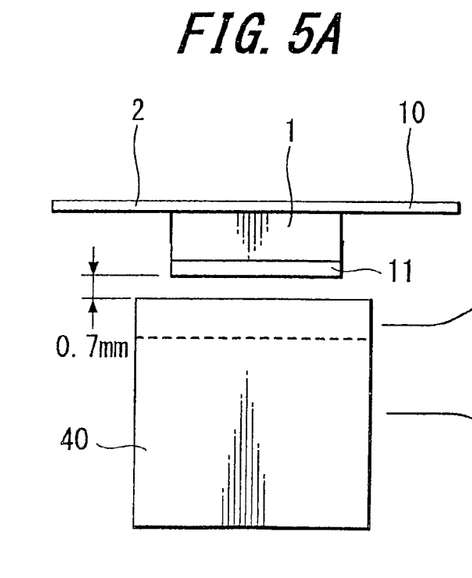
Figure 5B:
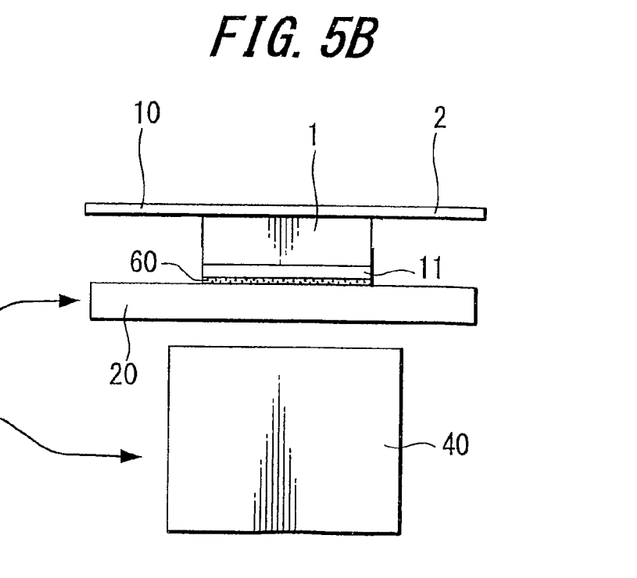

Furthermore, according to the embodiment, the fixing glass plate 20 is sandwiched between the image capture device 1 and the prism 40. Here, the height of the fixing glass plate 20 in the thickness direction and the height of the prism 40 in the optical-axis direction can be adjusted so as to keep the distance between the image capture device 1 and the lens (not shown) constant. FIG. 5A illustrates an arrangement of the image capture device 1 and the prism 40 when the fixing glass plate 20 is not sandwiched. In contrast, FIG. 5B illustrates an arrangement of the fixing glass plate 20 and the prism 40 in addition to the image capture device 1 according to the embodiment.

In FIG. 5A, the distance between the CMOS-sealing glass member 11 and the prism 40 is 0.7 mm. Under this condition, if the fixing glass plate 20 is sandwiched between the image capture device 1 and the prism 40, the distance between the image capture device 1 and the lens will become long. Accordingly, the upper portion of the prism 40 indicated by the dashed line in FIG. 5A is replaced with the height of the fixing glass plate 20 in the thickness direction. That is, such a replacement is carried out for preventing the distance between the image capture device 1 and the lens from being changed even if the fixing glass plate 20 is sandwiched. The height of the prism 40 in the optical axis direction is then adjusted to be lowered by just that much. FIG. 5B illustrates an exemplified arrangement of the image capture device 1, the fixing glass plate 20, and the prism 40 in this case.

As described above, both the height of the fixing glass plate 20 in the thickness direction and the height of the prism 40 in the optical axis direction are adjusted. Therefore, there is no need of changing the distance between the image capture device 1 and the lens even when the fixing glass plate 20 is inserted.

Figure 6A:
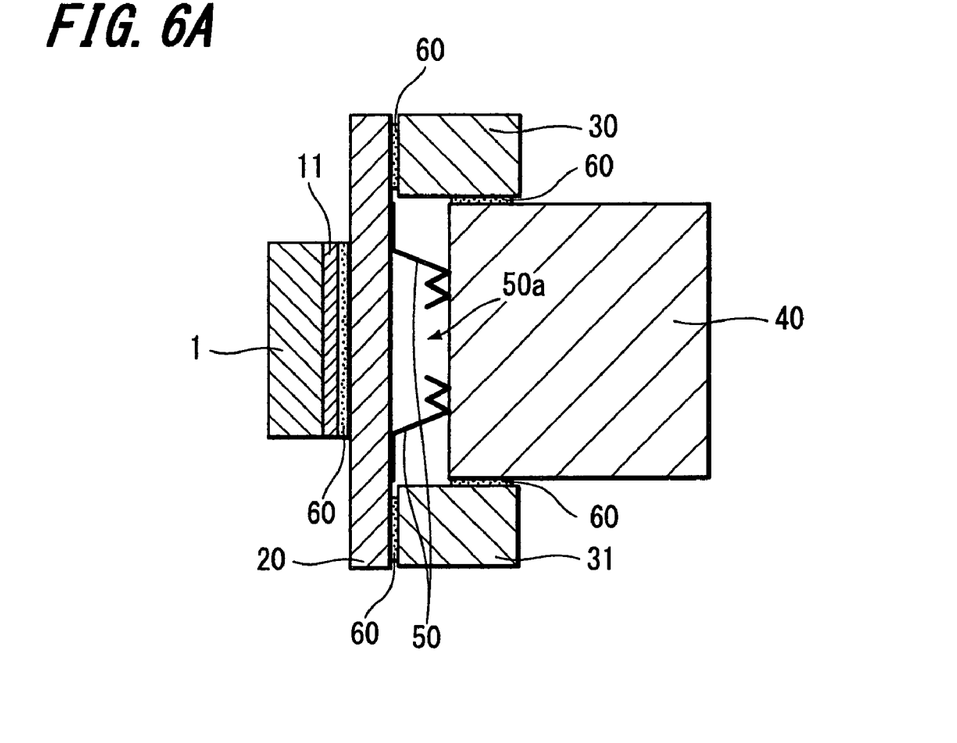
Figure 6B:
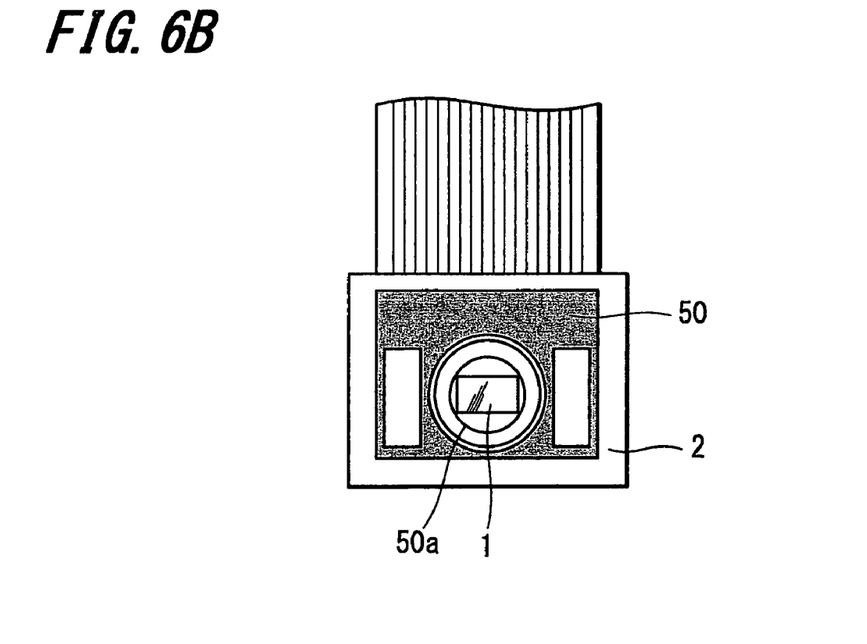

In the present embodiment, furthermore, a dust-resistance member 50 is installed in a gap between the fixing glass plate 20 and the prism 40. An example of the fixing of the dust-resistant member 50 will be described with reference to FIGS. 6A and 6B. FIG. 6A is a cross sectional view and FIG. 6B is a front view. In FIG. 6A, the dust-resistant member 50 is attached on the fixing glass plate 20 and formed in the shape of filling the space between the fixing glass plate 20 and the prism 40. In addition, an opening 50a is formed in the dust-resistant member 50. The opening 50a allows the light incident from the prism 40 to pass through it.

FIG. 6B illustrates that the dust-resistant member 50 is arranged on the substrate 2 on which the image capture device 1 is mounted. In FIG. 6B, but not shown in the figure, the dust-resistant member 50 is actually fixed on the substrate 2 through the fixing glass plate 20 (not shown). The image capture device 1 can be seen through the opening 50a of the dust-resistant member 50.

As described above, the dust-resistant member 50 having the opening 50a is placed in the gap between the fixing glass plate 20 and the prism 40. Thus, such a configuration of the dust-resistant member 50 can prevent dusts or the like from entering the gap between the fixing glass plate 20 and the prism 40. In addition, it can also prevent any portion other than the light-receiving part of the image capture device 1 to be irradiated with light.

Furthermore, the dust-resistant member 50 may be made of a material having no corner on the portion contacting with the prism 40. Such a material is of low stress and low friction. In addition, for example, the dust-resistant member 50 has a thickness of approximately 0.1 mm.

Subsequently, referring to the flowchart of FIG. 7, an example of the process for fixing between the image capture device 1 and the prism 40 will be described. First, the image capture device 1 is mounted on the substrate 2 (Step S1). Then, the fixing glass plate 20 is attached to the CMOS-sealing glass member 11 that seals the image capture device 1 (Step S2). Subsequently, the dust-resistant member 50 is attached to the fixing glass plate 20 (Step S3). After that, three-color light components R, G, and B obtained by separating light through the prism 40 are aligned with the light-receiving surface of the image capture device 1 while holding the substrate 2 (Step S4).

Figure 8:
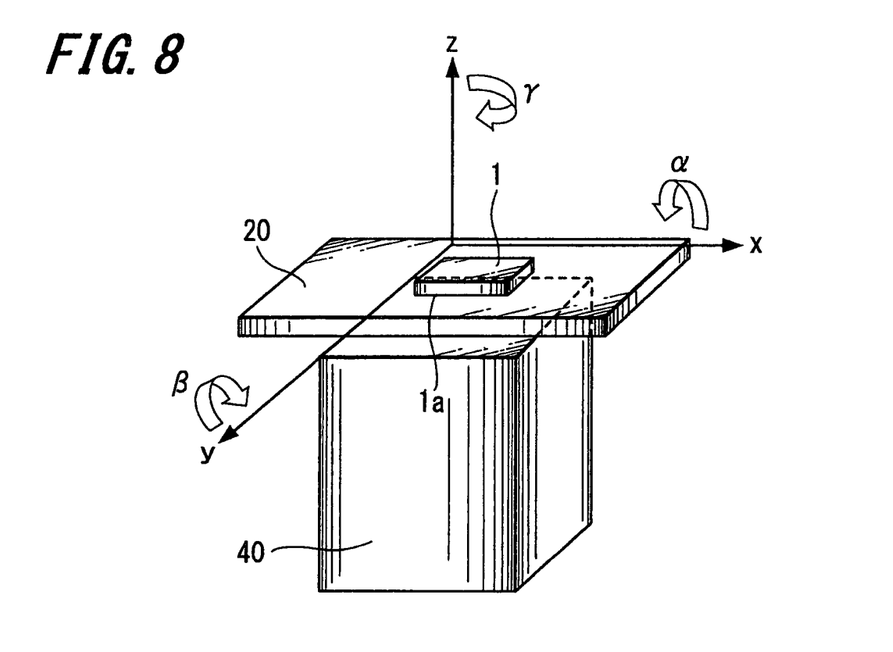
FIG. 8 is a perspective view illustrating an example of a position alignment between an image capture device and a prism according to an embodiment of the present invention.

As shown in FIG. 8, the position alignment between the prism 40 and the image capture device 1 is carried out with respect to the horizontal direction (X axis), vertical direction (Y direction), and cross direction (z axis) thereof and rotation directions (α, β, and γ) about their respective axes. Furthermore, in FIG. 8 and FIGS. 9 and 10, which will be referred later, omit the diagrammatic representation of the substrate 2. The position alignment between the prism 40 and the image capture device 1 is carried out using a jig or the like (not shown). In addition, the image capture device 1 may be fixed at a position where it shows reliabilities in environment test, mechanical test, and so on without displacement thereof being occurred.

Figure 7:
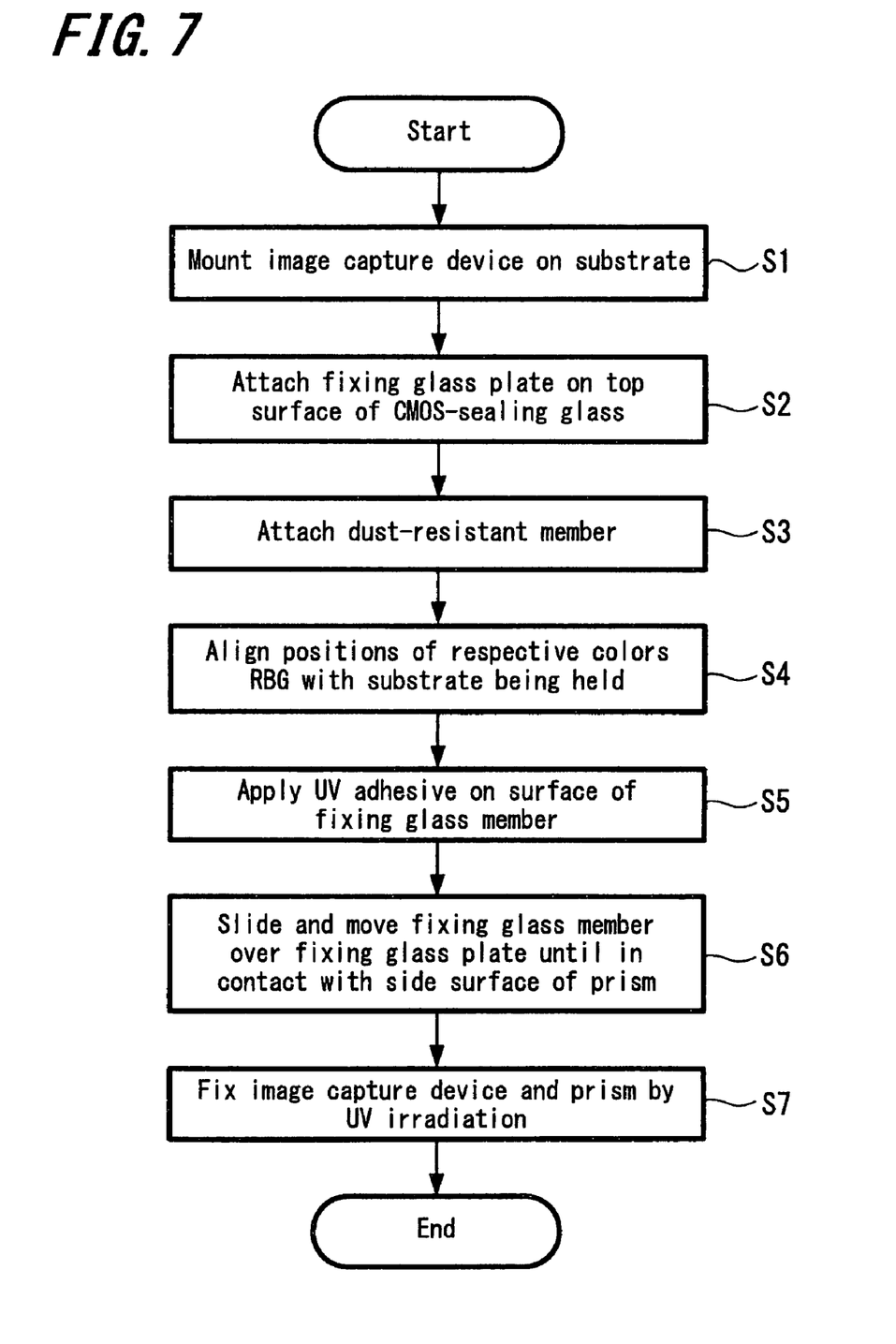
FIG. 7 is a flowchart indicating an example of a process of fixing between an image capture device and a prism according to an embodiment of the present invention.

Referring back to the flowchart of FIG. 7 for further description, a UV adhesive 60 is applied on two surfaces, i.e., the side surfaces of the respective fixing glass members 30 and 31, after completing the position alignment between the prism 40 and the image capture device 1 (Step S5). The two surfaces, the side surfaces of the respective fixing glass members 30 and 31, are the surface to be attached to the fixing glass plate 20 and the surface to be attached to the prism 40.

After applying the UV adhesive 60 on the fixing glass members 30 and 31, the fixing glass members 30 and 31 are simultaneously brought into contact with the fixing glass plate 20 and then moved until in contact with the prism 40 (Step S6). In this case, the positional relationship between the fixing glass members 30 and 31, the fixing glass plate 20, and the prism 40 is represented in FIG. 9.

Figure 9:
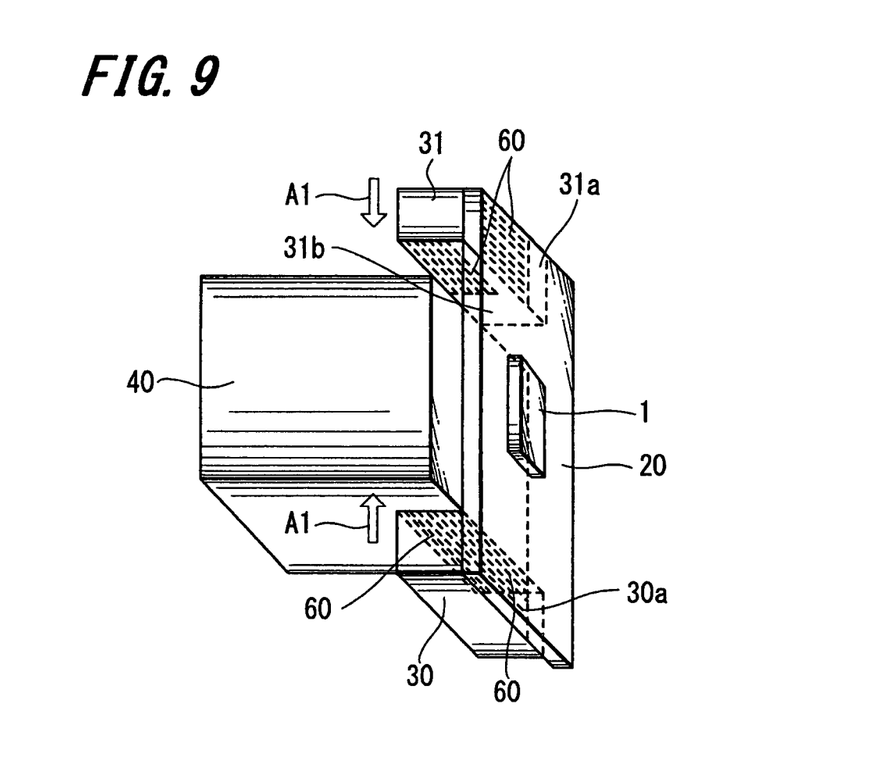
FIG. 9 is a perspective view illustrating an example of an installation of a fixing glass member according to an embodiment of the present invention.

The fixing of the fixing glass members 30 and 31 are carried out while the fixing glass plate 20 and the plate 40 are laid down as shown in FIG. 9. In this figure, among the surfaces that constitute the fixing glass members 30 and 31, the UV adhesive 60 is applied on the surfaces 30a and 31a attaching to the fixing glass plate 20 and the surfaces 30b and 31b attaching to the prism 40. For the fixing of the fixing glass members 30 and 31, as shown in FIG. 9, the attaching surface 30a of the fixing glass member 30 and the attaching surface 31a of the fixing glass member 31 are brought into contact with the fixing glass plate 20. Then, the fixing glass members 30 and 31 are slid in the directions indicated by arrows A1 in FIG. 9 and moved until in contact with the side surface of the prism 40.

Figure 10:
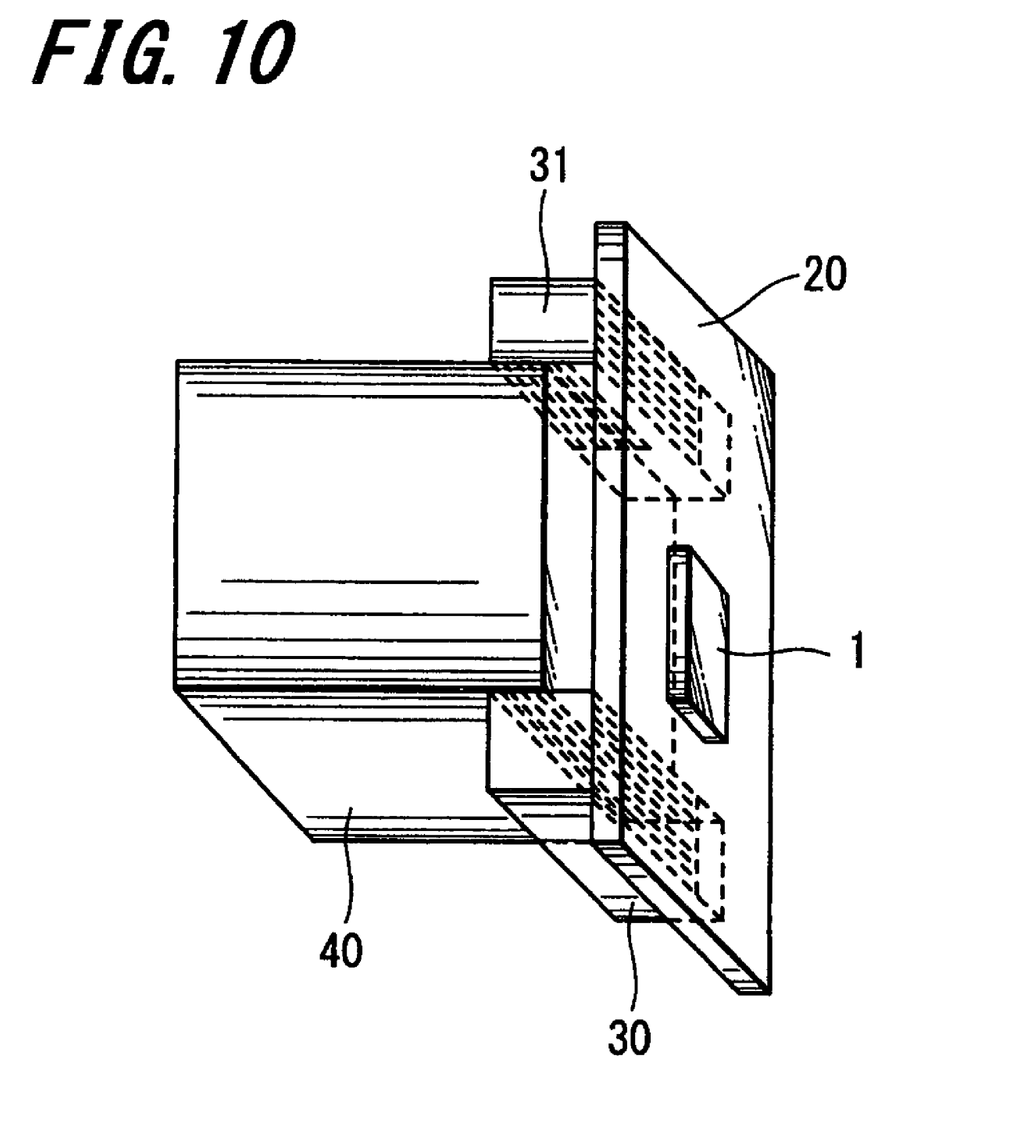
FIG. 10 is a perspective view illustrating an example of fixing between an image capture device and a prism according to an embodiment of the present invention.

FIG. 10 shows that the fixing glass members 30 and 31 are in contact with the side surfaces of the prism 40. As shown in FIG. 10, the fixing plate 20 attached on the image capture device 1 and the prism 40 are held through the fixing glass members 30 and 31.

Here, referring again to the flowchart of FIG. 7, the description will be further continued. When the fixing glass members 30 and 31 are arranged on the side surfaces of the prism 40 in Step S6 (when becoming the state shown in FIG. 10), the UV adhesive is cured by UV irradiation to fix the image capture device 1 on the prism 40 (Step S7).

Thus, the image capture device 1 can be fixed on the prism 40 while being mounted on the substrate 2. Therefore, the number of steps for the assembly can be reduced as compared with the procedure for fixing the image capture device 1 on the prism 40 and then attaching with the substrate 2.

Furthermore, in the present embodiment, the adhesive is only used for the attaching surfaces of the fixing glass members 30 and 31 and the fixing plate 20 and the attaching surfaces of the fixing glass members 30 and 31 and the prism 40. Thus, the volume of the adhesive can be kept small. Therefore, the possibility of a displacement due to temperature changes, which may be caused by differences in linear expression coefficients, becomes small.

It should be noted that specific numerical values represented in the embodiment described so far are provided as examples, so that the an embodiment of the present invention is not limited to those numerical values.

Furthermore, in the embodiment described above, the example using the CMOS device as an image capture device has been described. Alternatively, any of other image capture devices, such as CCD (Charge Coupled Device), may be used. The image capture device may be mounted on the substrate in other manners than surface-mounting.

Furthermore, in the above embodiment, the example in which the configuration of the image capture apparatus is applied on the video camera has been described. Alternatively, the configuration may also be applied to any of various image capture apparatus, such as one integrated with a recording unit as a video camera.

Furthermore, in the above embodiment, the three-plate-type image capture apparatus has been exemplified and described. However, the configuration of the image capture apparatus may be applied to, for example, the two-plate-type or four-plate-type image capture apparatus.

Furthermore, in the above embodiment, the image capture apparatus is configured so as to have high resistance to temperature changes. Thus, the fixing glass plate 20 and the fixing glass members 30 and 31 are made of the same material as that of the prism 40. However, any of other materials, such as ceramics and titanium is used as long as it is a material having a thermal expansion coefficient similar to that of the prism 40.

Furthermore, in the embodiment described above, the capture device 1 is fixed on the prism 40 through the fixing glass plate 20. Alternatively, instead of the fixing glass plate 20, a larger sealing glass material for the image capture device 1 may be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture apparatus having a prism that separates light incident through a lens into at least two color components of light to be output and an image capture device that converts light separated by and output from the prism into a captured image signal, comprising:
    a fixing plate attached to the image capture device mounted on a substrate; and
    a plurality of fixing members for fixing an unattached surface of the fixing plate, which is unattached to the image capture device, and a side surface of the prism through an adhesive,
    in which one of a surface of the fixing members and a surface of the prism that are attached to each other is a rough surface, and
    wherein both of a surface of the fixing members and a surface of the fixing plate that are attached to each other are mirror surfaces.

2. An image capture apparatus according to claim 1, wherein a UV-curing adhesive is used for fixing the image capture device and the fixing plate, fixing the fixing members and the prism, and fixing the fixing members and the fixing plate.

3. An image capture apparatus according to claim 1, wherein a cut-away portion is provided to the fixing members at a position where a non-contacting surface thereof to the prism is perpendicular to a non-contacting surface thereof to the fixing plate.

4. An image capture apparatus according to claim 3, wherein a height of the prism in an optical-axis direction is reduced by an amount equal to a thickness of the fixing plate such that a distance between the image capture device and the lens without the fixing plate is equal to a distance between the image capture device and the lens with the fixing plate inserted between the image capture device and the lens.

5. An image capture apparatus according to claim 4, wherein
    the fixing plate and the fixing members are made of glass materials permeable to UV light for curing the UV-curing adhesive.

6. An image capture apparatus according to claim 5, wherein
    the image capture device is connected to the fixing plate through a sealing glass member for the image capture device.

7. An image capture apparatus according claim 6, wherein the fixing plate is formed by the sealing glass member for the image capture device.

8. An image capture apparatus according to claim 7, wherein
    a dust-resistant member is provided between the fixing plate and the prism.

9. An image capture apparatus comprising:
a prism that separates light incident through a lens into at least two color components of light to be output;
an image capture device that converts light separated by and output from the prism into a captured image signal;
a fixing plate attached to the image capture device mounted on a substrate; and
a plurality of fixing members for fixing an unattached surface of the fixing plate, which is unattached to the image capture device, and a side surface of the prism through an adhesive,
in which one of a surface of the fixing members and a surface of the prism that are attached to each other is a rough surface, and
wherein both of a surface of the fixing members and a surface of the fixing plate that are attached to each other are mirror surfaces.

* * * * *